Figure 1:
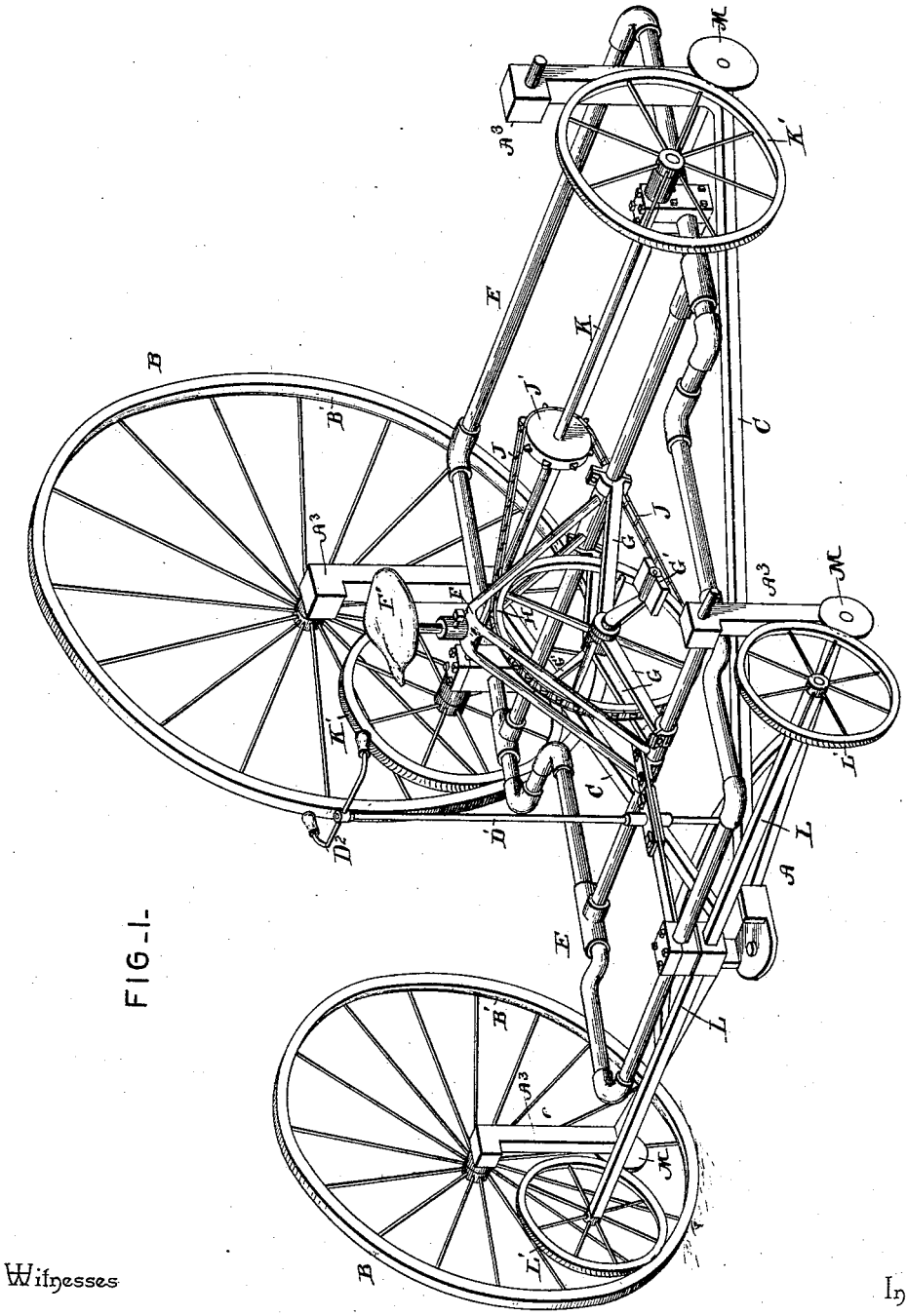

(No Model.) 2 Sheets—Sheet 1.

E. V. SANTEE.
ROAD VEHICLE.

No. 478,715. Patented July 12, 1892.

Witnesses
Jas. K. McCathran
Charles S. Hyer

By his Attorneys,

Inventor
Elmer V. Santee
C. A. Snow & Co.

(No Model.) 2 Sheets—Sheet 2.
E. V. SANTEE.
ROAD VEHICLE.
No. 478,715. Patented July 12, 1892.
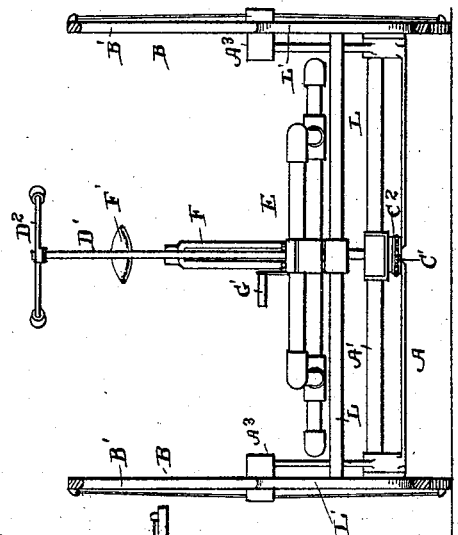
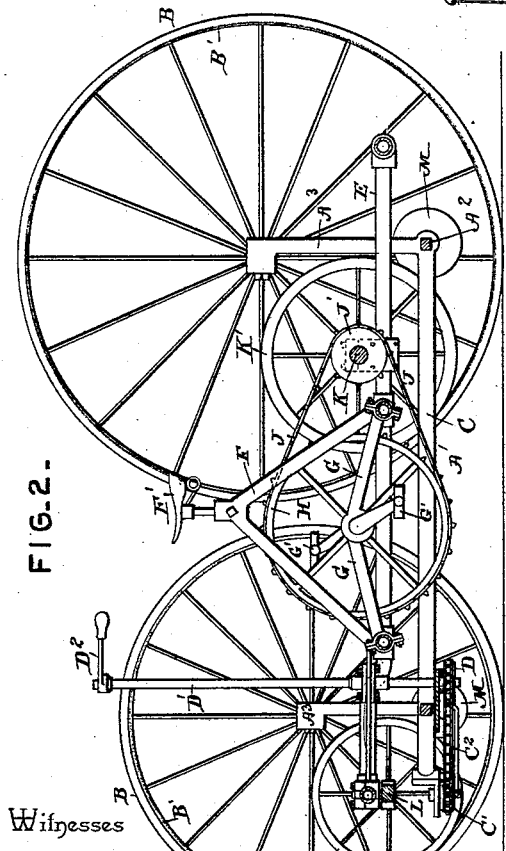
Witnesses
Jas. K. McCathran
Charles S. Hyer
Inventor
Elmer V. Santee
By his Attorneys,
C. A. Snow & Co.

UNITED STATES PATENT OFFICE.

ELMER V. SANTEE, OF EASTON, PENNSYLVANIA.

ROAD-VEHICLE.

SPECIFICATION forming part of Letters Patent No. 478,715, dated July 12, 1892.

Application filed March 16, 1892. Serial No. 425,142. (No model.)

*To all whom it may concern:*

Be it known that I, ELMER V. SANTEE, a citizen of the United States, residing at Easton, in the county of Northampton and State of Pennsylvania, have invented a new and useful Road-Vehicle, of which the following is a specification.

My invention relates to road-vehicles; and it consists in the construction and arrangement of parts, as will be more fully hereinafter described and claimed.

The object of my invention is to provide a vehicle that can be driven by foot-pedals and connected gearing as a means of propulsion, somewhat after the manner of a velocipede or analogous machines.

In the drawings, Figure 1 is a perspective view of a road-vehicle embodying my invention, showing part of the road-wheels removed. Fig. 2 is a side elevation thereof. Fig. 3 is a bottom plan view of the same. Fig. 4 is a front view.

In the drawings, A designates a frame having front and rear cross-beams or bolsters A' A², from the ends of which vertically rise standards or supports A³, supporting the journals of road-wheels B. The spokes of the said wheels B are located on the exterior face thereof, thereby leaving the inner periphery or rim free, and which is formed with a continuous track-flange B' for a purpose to be hereinafter more fully set forth.

The frame A is provided with braces C, which converge and extend from the front to the rear of the said frame. To the front ends of said braces is connected a turning block or table, to which is secured a chain or sprocket wheel C', which is surrounded by a chain C², extended rearward and engaging another sprocket-wheel D on the lower end of a vertical rod or bar D', having a handle-bar D² on the upper end thereof. By this means the front pair of wheels may be turned and the vehicle thereby guided.

Over the frame A is mounted a frame E, on which is fixed a standard F, carrying a saddle or seat F'. At the lower part of said standard are located truss-bars or supports G for the pedals G', the journals of said pedals extending through said truss-bar, and connected to a chain-wheel H, surrounded by a chain J, running to the rear and engaging a smaller chain-wheel J', fixed on a shaft K, journaled in said frame E. On the ends of said shaft K are keyed or secured grooved friction-wheels K', which bear on the track-flange B' of the road-wheels adjacent thereto. At the front of said frame E an axle L is pivotally connected, and on the ends thereof grooved friction-wheels L' are secured and bear on the track-flanges B' of the forward wheels B. The axle L is pivoted to the front end of the frame E, so that it may readily turn with the wheels B when they are operated to turn or guide the vehicle. The wheels K' and L' bear upon the track-flanges B' of the wheels B in advance of the central vertical plane thereof, and are held in such position by idlers M, secured to the standards or supports A³ in rear of said wheels K' and L', and engage the groove in said latter wheels to thereby prevent disengagement of the same from the track-flanges B'. These idlers M also insure continual contact of the wheels K' and L' with the track-flanges B', and thereby prevent loss of power. It will be observed that said idlers are located below the central line of the wheels K' and L' to produce the contact set forth and prevent disengagement of the said wheels K' and L'. The handle-bar D² is situated adjacent to the saddle or seat F' and can be readily manipulated therefrom. When the pedals G' are operated, the chain-wheel H is revolved, and through the medium of the chain J, engaging the wheel J', the shaft K is turned and operates the friction-wheels K' and the rear road-wheels B, which are the driving-wheels for the vehicle. The front wheels L' are employed to insure steady movement of the front road-wheels B and to sustain the same rate of speed in the said front wheels B as in the back wheels.

The advantages and conveniences of the device as a whole are readily apparent and need not be further explained herein.

Having thus described my invention, what is claimed as new is—

1. In a road-vehicle, the combination of road-wheels having track-flanges on the inner peripheries thereof, grooved friction-wheels engaging said track-flanges, mechanism for operating said friction-wheels, and idlers engaging said friction-wheels to sustain them in position, all of which is supported on a suitable frame, substantially as described.

2. In a road-vehicle, the combination of a frame, road-wheels journaled on uprights rising from said frame, having track-flanges on the inner peripheries thereof, grooved friction-wheels engaging said track-flanges in advance of the central vertical plane of said road-wheels, idlers rotatably secured to the lower portions of the aforesaid uprights and engaging the lower rear portions of the said friction-wheels, and crank-driven sprocket-wheels and a chain belt for operating the rearmost of said sprocket-wheels and said friction-wheels, substantially as described.

3. In a road-vehicle, the combination of a frame, road-wheels journaled thereon having track-flanges on their inner peripheries and spokes connected to their outer faces, grooved frictional wheels engaging said track-flanges in advance of the central vertical planes of said road-wheels, and idlers engaging said frictional wheels below the central horizontal planes thereof, substantially as described.

4. In a road-vehicle, the combination of the frame comprising upper and lower parts, road-wheels supported by the lower part of said frame and having track-flanges on the inner peripheries thereof, and friction-wheels carried by the upper part of said frame and engaging the track-flanges of said road-wheels, substantially as described.

5. In a road-vehicle, the combination of a frame comprising upper and lower parts, road-wheels supported by the lower part of said frame and having track-flanges on the inner peripheries thereof, frictional wheels carried by the upper part of said frame engaging said track-flanges, and idlers carried by the lower part of said frame and bearing against said frictional wheels, said parts being operated substantially as described.

6. In a road-vehicle, the combination of the frame comprising upper and lower parts, road-wheels journaled to the lower part of said frame and having track-flanges on the inner peripheries thereof, frictional wheels carried by the upper part of said frame, the forward pair of said frictional wheels being pivotally attached, idlers connected to the lower part of said frame and engaging said frictional wheels to hold them in position, and a chain-and-sprocket mechanism for operating the rear pair of said frictional wheels, substantially as described.

7. In a road-vehicle, the combination of the frame comprising an upper and a lower part, uprights or standards connected to the lower part of said frame, road-wheels journaled to said uprights or standards and having flanges on their inner peripheries, frictional wheels carried by the upper part of said frame and engaging said flanges of said road-wheels, idlers carried by the lower part of said frame and engaging said frictional wheels, an upright bar or rod having sprocket-wheel and chain connection with the front pair of road-wheels, and a handle-bar for turning said road-wheels, a seat or saddle in rear of said handle-bar, a chain-wheel under said seat or saddle having driving-pedals, and a chain-wheel on the shaft of the rear pair of frictional wheels, connected with the aforesaid chain-wheel having the pedals, whereby the vehicle may be driven or propelled, substantially as described.

8. The combination of a suitable frame, wheels supported thereon having inner peripheral track-flanges or projections, and grooved wheels engaging said track-flanges or projections of the said wheels, the said wheels being also arranged in connected pairs and the rearmost pair thereof being driven by a suitable chain-belt and sprocket-wheel mechanism, substantially as described.

In testimony that I claim the foregoing as my own I have hereto affixed my signature in the presence of two witnesses.

ELMER V. SANTEE.

Witnesses:
H. J. REED,
F. E. STECKEL.